United States Patent
Siw et al.

(10) Patent No.: US 11,193,389 B2
(45) Date of Patent: Dec. 7, 2021

(54) FLUID COOLED SEAL LAND FOR ROTATIONAL EQUIPMENT SEAL ASSEMBLY

(71) Applicant: United Technologies Corporation, Farmington, CT (US)

(72) Inventors: Sin Chien Siw, Windsor, CT (US); Timothy Castaldo, West Hartford, CT (US); Charles J. Banas, Norwich, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/657,451

(22) Filed: Oct. 18, 2019

(65) Prior Publication Data

US 2021/0115812 A1 Apr. 22, 2021

(51) Int. Cl.
*F01D 25/12* (2006.01)
*F01D 11/00* (2006.01)

(52) U.S. Cl.
CPC ............ *F01D 25/12* (2013.01); *F01D 11/005* (2013.01); *F05D 2220/32* (2013.01); *F05D 2230/60* (2013.01); *F05D 2240/55* (2013.01); *F05D 2260/232* (2013.01)

(58) Field of Classification Search
None
See application file for complete search history.

(56) References Cited

U.S. PATENT DOCUMENTS

| | | |
|---|---|---|
| 1,269,941 A | 6/1918 | Kelley |
| 2,857,182 A | 10/1958 | Bain |
| 2,874,803 A | 2/1959 | Gunberg |
| 2,990,202 A | 6/1961 | Dennison |
| 3,147,013 A | 9/1964 | Tracy |
| 3,915,521 A * | 10/1975 | Young ................. F16C 33/6677 384/467 |
| 3,958,314 A | 5/1976 | Kurkjian, Jr. |
| 4,164,833 A | 8/1979 | Todd |
| 4,406,459 A | 9/1983 | Davis |
| 4,758,028 A | 7/1988 | Davies |

(Continued)

FOREIGN PATENT DOCUMENTS

JP 2007078072 A 3/2007

OTHER PUBLICATIONS

EP search report for EP20202415.4 dated Mar. 10, 2021.

*Primary Examiner* — David E Sosnowski
*Assistant Examiner* — Jason Fountain
(74) *Attorney, Agent, or Firm* — Getz Balich LLC

(57) ABSTRACT

A seal land includes a seal land body that extends circumferentially about an axis and radially between an inner seal land side and an outer seal land side. The seal land body is configured with a plurality of fluid passages arranged about the axis. A first of the fluid passages includes an inner passage segment and an outer passage segment fluidly coupled with the inner passage segment. The inner passage segment extends along a first trajectory within the seal land body towards the outer passage segment. The outer passage segment extends along a second trajectory within the seal land body away from the inner passage segment and towards the outer seal land side. The second trajectory is different than the first trajectory and includes a radial component and a circumferential component.

12 Claims, 10 Drawing Sheets

(56) References Cited

U.S. PATENT DOCUMENTS

| | | | |
|---|---|---|---|
| 4,928,978 A | 5/1990 | Shaffer | |
| 5,174,584 A | 12/1992 | Lahrman | |
| 5,284,347 A | 2/1994 | Pope | |
| 5,593,165 A | 1/1997 | Murray | |
| 5,626,347 A | 5/1997 | Ullah | |
| 5,685,671 A | 11/1997 | Packer | |
| 5,725,338 A | 3/1998 | Cabaret | |
| 5,813,830 A | 9/1998 | Smith | |
| 5,971,703 A | 10/1999 | Bouchard | |
| 6,142,729 A | 11/2000 | Tran | |
| 6,196,790 B1 | 3/2001 | Sheridan | |
| 6,363,706 B1 | 4/2002 | Meister | |
| 6,450,758 B1 | 9/2002 | Schmidt | |
| 6,619,908 B2 | 9/2003 | Bruno | |
| 6,688,847 B2 | 2/2004 | Oya | |
| 6,719,296 B2 | 4/2004 | Brauer | |
| 7,025,356 B1 | 4/2006 | Cheung | |
| 7,172,388 B2 | 2/2007 | Synnott | |
| 7,175,388 B2 | 2/2007 | Labbé | |
| 7,207,771 B2 | 4/2007 | Synnott | |
| 7,252,291 B2 | 8/2007 | Khonsari | |
| 7,374,395 B2 | 5/2008 | Durocher | |
| 7,435,052 B2 | 10/2008 | Spencer | |
| 7,726,021 B2 | 6/2010 | Barnett | |
| 7,797,941 B2 | 9/2010 | Munsell | |
| 7,828,513 B2 | 11/2010 | Durocher | |
| 7,850,173 B2 | 12/2010 | Ivakitch | |
| 7,857,576 B2 | 12/2010 | Durocher | |
| 7,905,495 B2 | 3/2011 | Munson | |
| 7,909,570 B2 | 3/2011 | Durocher | |
| 7,938,402 B2 | 5/2011 | Garrison | |
| 8,074,997 B2 | 12/2011 | Garrison | |
| 8,172,514 B2 | 5/2012 | Durocher | |
| 8,186,692 B2 | 5/2012 | Durocher | |
| 8,215,895 B2 | 7/2012 | Henry | |
| 8,678,741 B2 | 3/2014 | Olennikov | |
| 8,845,282 B2 * | 9/2014 | LaPierre | F01D 25/183 415/170.1 |
| 9,719,373 B2 | 8/2017 | Maret | |
| 10,174,629 B1 * | 1/2019 | Valva | F16C 33/667 |
| 2009/0051120 A1 | 2/2009 | Munsell | |
| 2009/0107106 A1 | 4/2009 | Munsell | |
| 2009/0212501 A1 | 8/2009 | Glahn | |
| 2009/0322031 A1 | 12/2009 | Roche | |
| 2011/0049809 A1 | 3/2011 | Garrison | |
| 2011/0068541 A1 | 3/2011 | Durling | |
| 2011/0299984 A1 | 12/2011 | Garrison | |
| 2013/0078079 A1 * | 3/2013 | LaPierre | F01D 25/16 415/110 |
| 2014/0119887 A1 * | 5/2014 | Lyle | F01D 25/183 415/110 |
| 2018/0045316 A1 * | 2/2018 | Kovacik | F16J 15/324 |
| 2018/0106157 A1 | 4/2018 | Kovacik | |
| 2020/0271013 A1 * | 8/2020 | Zelesky | F01D 25/12 |

\* cited by examiner

FLUID COOLED SEAL LAND FOR ROTATIONAL EQUIPMENT SEAL ASSEMBLY

BACKGROUND OF THE DISCLOSURE

1. Technical Field

This disclosure relates generally to rotational equipment and, more particularly, to a seal assembly for a piece of rotational equipment such as a gas turbine engine.

2. Background Information

A piece of rotational equipment, such as a gas turbine engine, may include various seal assemblies for sealing gaps between stationary components and rotating components. Various seal assembly types and configurations are known in the art. While these known seal assembly configurations have various advantages, there is still room in the art for improvement. For example, durability of a seal land of a dry face seal assembly may be compromised where rubbing friction between the seal land and an interfacing carbon seal element significantly increases a temperature of a portion of the seal land adjacent the interface. To reduce such an increase in temperature, it is known in the art to provide a seal land with internal passages for flowing cooling fluid therethrough. Typical cooling fluid passage designs, however, generally concentrate cooling in an intermediate region of the seal land, which is relatively far from the interface with the carbon seal element. There is a need in the art therefore for an improved seal land with enhanced cooling.

SUMMARY OF THE DISCLOSURE

According to an aspect of the present disclosure, a seal land is provided for a seal assembly in a piece of rotational equipment. This seal land includes a seal land body extending circumferentially about an axis and radially between an inner seal land side and an outer seal land side. The seal land body is configured with a plurality of fluid passages arranged about the axis. A first of the fluid passages includes an inner passage segment and an outer passage segment fluidly coupled with the inner passage segment. The inner passage segment extends along a first trajectory within the seal land body towards the outer passage segment. The outer passage segment extends along a second trajectory within the seal land body away from the inner passage segment and towards the outer seal land side. The second trajectory is different than the first trajectory and includes a radial component and a circumferential component.

According to another aspect of the present disclosure, an assembly is provided for a piece of rotational equipment. This assembly includes an annular seal land and an annular seal element. The annular seal land is configured to rotate about an axis. The annular seal element is configured to sealingly engage a seal land surface of the annular seal land in an axial direction along the axis. The annular seal land is configured with a plurality of fluid passages arranged about the axis. A first of the fluid passages includes an inner passage segment and an outer passage segment fluidly coupled with the inner passage segment. The inner passage segment extends along a first trajectory within the annular seal land towards the outer passage segment. The outer passage segment extends along a second trajectory within the annular seal land to a radial outer surface of the annular seal land. The second trajectory is different than the first trajectory and includes a radial component and a circumferential component.

According to still another aspect of the present disclosure, a manufacturing method is provided during which a seal land is formed for a seal assembly in a piece of rotational equipment. The seal land extends circumferentially about an axis and radially between an inner seal land side and an outer seal land side. The seal land is configured with a plurality of fluid passages. A first of the fluid passages includes an inner passage segment and an outer passage segment fluidly coupled with the inner passage segment. The inner passage segment extends along a first trajectory within the seal land towards the outer passage segment. The outer passage segment extends along a second trajectory within the seal land away from the inner passage segment and to the outer seal land side. The second trajectory is different than the first trajectory and includes a radial component and a circumferential component.

The forming of the seal land may include additively manufacturing the seal land.

The forming of the seal land may include drilling one or more of the fluid passages.

The seal land body may include an annular seal land surface configured to axially and sealingly engage with a seal element of the seal assembly. The outer passage segment may be disposed axially adjacent the annular seal land surface.

The second trajectory may be parallel with the annular seal land surface.

The annular seal land surface may have a first radial height. The outer passage segment may have a second radial height that is at least eighty percent of the first radial height.

The second trajectory may be perpendicular to the axis.

The second trajectory may be a straight-line trajectory.

The second trajectory may be a non-straight-line trajectory.

The second trajectory may be a curved trajectory.

The seal land body may be further configured with a groove fluidly coupled with the first fluid passage.

A dry seal assembly may be included. This dry seal assembly may include the annular seal land and the annular seal element.

The annular seal element may be configured as or otherwise include a carbon seal element.

The inner passage segment may extend along the first trajectory to the outer passage segment.

The outer passage segment may be disposed axially adjacent the seal land surface.

The outer passage segment may completely radially overlap an engagement area between the annular seal element and the annular seal land.

The assembly may also include a stationary component of a turbine engine and a rotating component of the turbine engine. The annular seal element may be mounted to the stationary component of the turbine engine. The annular seal land may be rotatable with the rotating component of the turbine engine.

The foregoing features and the operation of the invention will become more apparent in light of the following description and the accompanying drawings.

DETAILED DESCRIPTION

Figure 1:
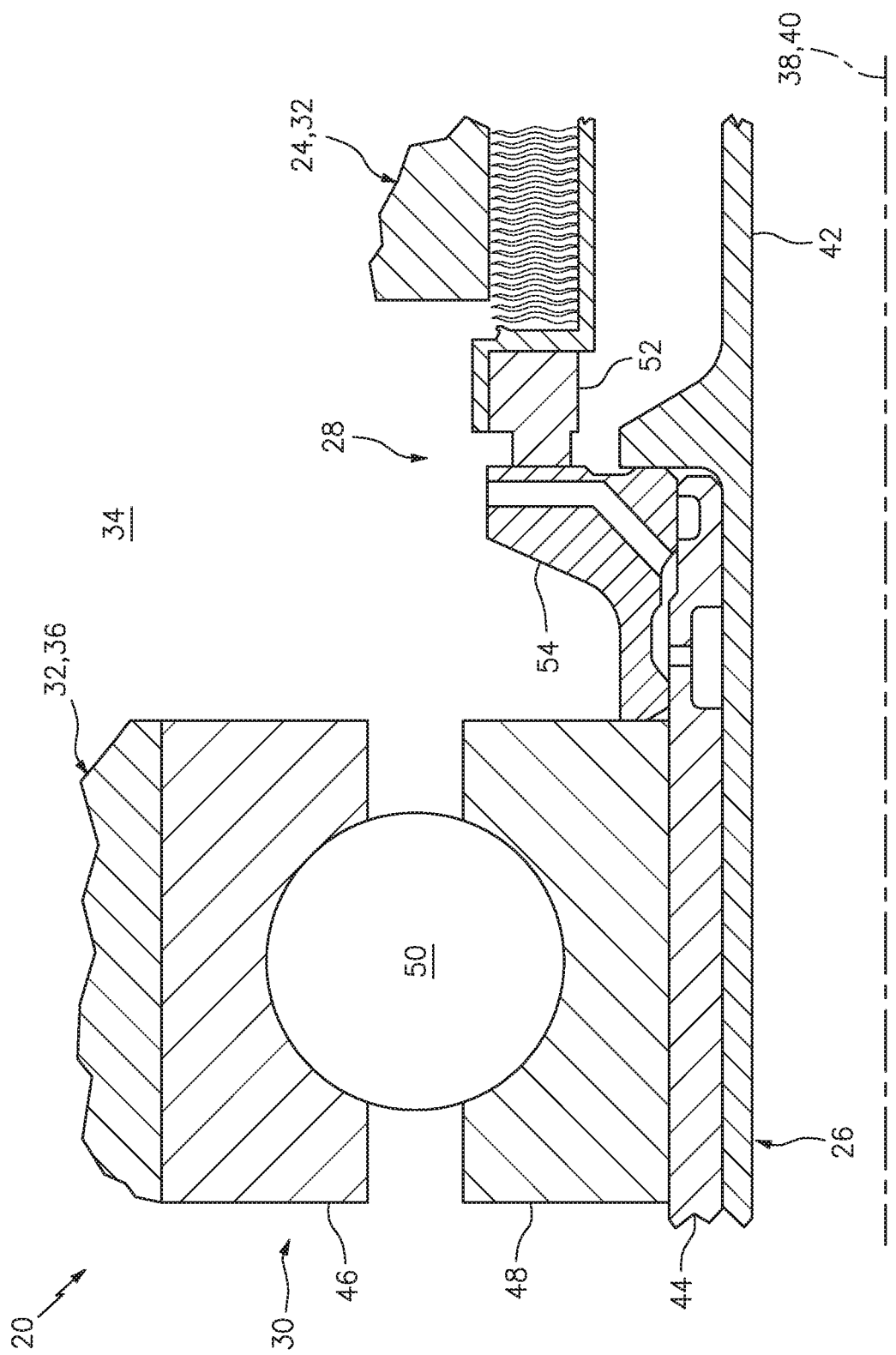
FIG. 1 is a partial side sectional illustration of an assembly for a piece of rotational equipment.
Figure 2:
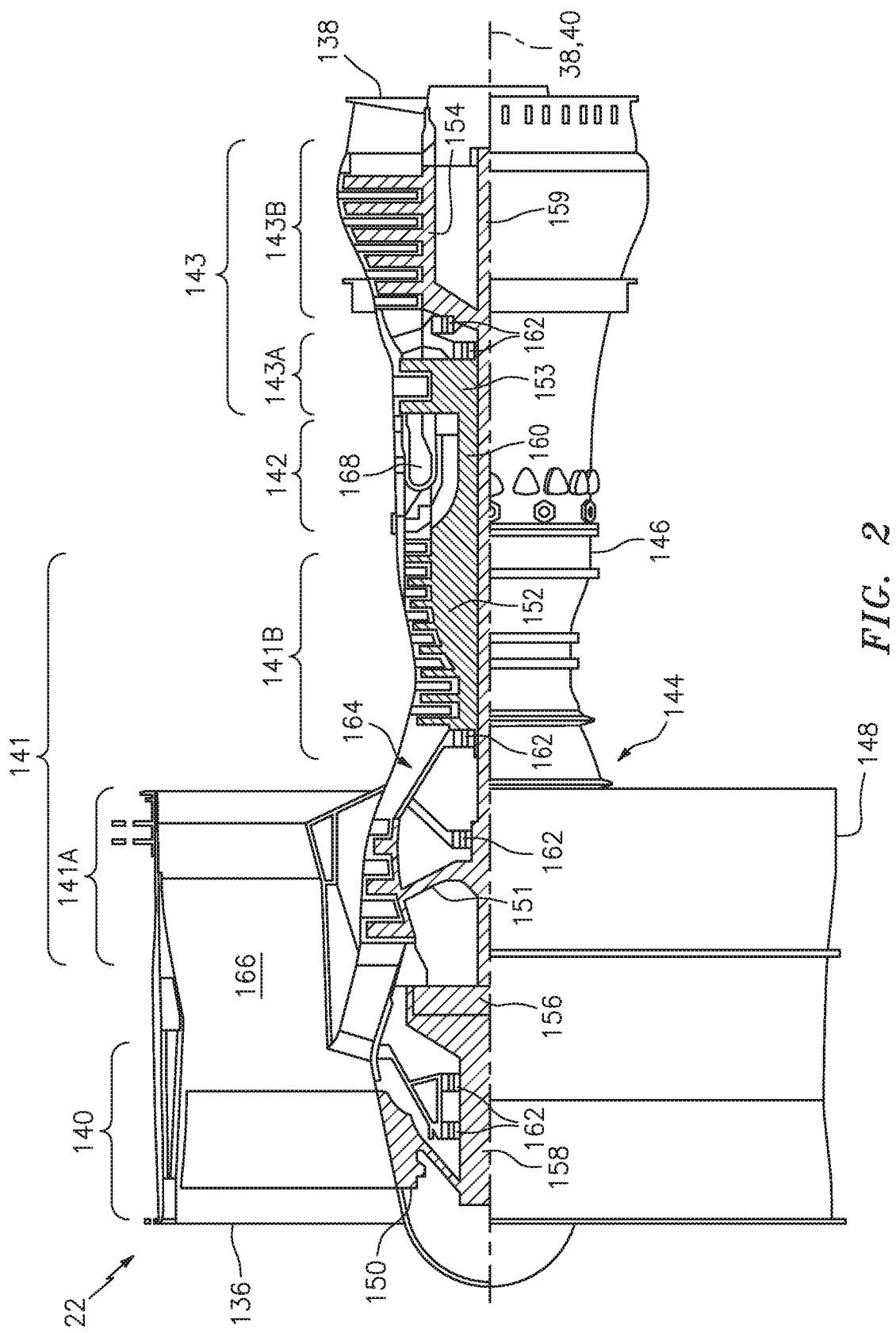
FIG. 2 is a side cutaway illustration of a geared turbofan gas turbine engine.

FIG. 1 is a partial side sectional illustration of an assembly 20 for a piece of rotational equipment. For ease of description, this piece of rotational equipment is referred to below as a gas turbine engine 22, an exemplary embodiment of which is shown in FIG. 2. The present disclosure, however, is not limited to any particular types or configurations of rotational equipment. The piece of rotational equipment, for example, may alternatively be configured as a wind, water or steam turbine, a rotary internal combustion engine or any other piece of rotational equipment in which a gap is sealed between two components that move relative to one another.

The assembly 20 of FIG. 1 includes a stationary component 24, a rotating component 26 and a seal assembly 28 configured to seal a (e.g., annular) gap between the stationary component 24 and the rotating component 26. The assembly 20 of FIG. 1 also includes a bearing 30.

The stationary component 24 of FIG. 1 is configured as a portion of a stationary structure 32; e.g., housing. This stationary structure 32 is configured to form a bearing compartment 34 that houses the bearing 30 within the gas turbine engine 22. The stationary structure 32 may also be configured with or otherwise be connected to a bearing support structure 36 such as, but not limited to, a strut assembly.

The rotating component 26 of FIG. 1 is rotatable about a rotational axis 38 of the assembly 20, which axis 38 may be coaxial with an axial centerline 40 of the gas turbine engine 22. The rotating component 26 of FIG. 1 includes at least a (e.g., tubular) engine shaft 42 and a tubular sleeve 44 mounted on and rotatable with the engine shaft 42. However, in other embodiments, the rotating component 26 may be configured without the sleeve 44 and/or with one or more additional elements. In still other embodiments, the rotating component 26 may be configured as another rotor within the gas turbine engine 22.

The bearing 30 is configured to rotatably support the rotating component 26 relative to the stationary structure 32. The bearing 30 may be configured as a roller element bearing. The bearing 30 of FIG. 1, for example, includes an annular outer race 46, an annular inner race 48 and a plurality of bearing elements 50 (one visible in FIG. 1); e.g., cylindrical or spherical elements. The outer race 46 circumscribes the inner race 48 and the bearing elements 50. The outer race 46 is mounted to the stationary structure 32. The inner race 48 circumscribes and is mounted to the rotating component 26. The bearing elements 50 are arranged in an annular array about the axis 38, which array is radially between and engaged with the outer race 46 and the inner race 48. The present disclosure, of course, is not limited to the foregoing exemplary bearing configuration. For example, in other embodiments, the bearing 30 may be configured as a journal bearing or any other type of bearing utilized in the gas turbine engine 22.

Figure 3:
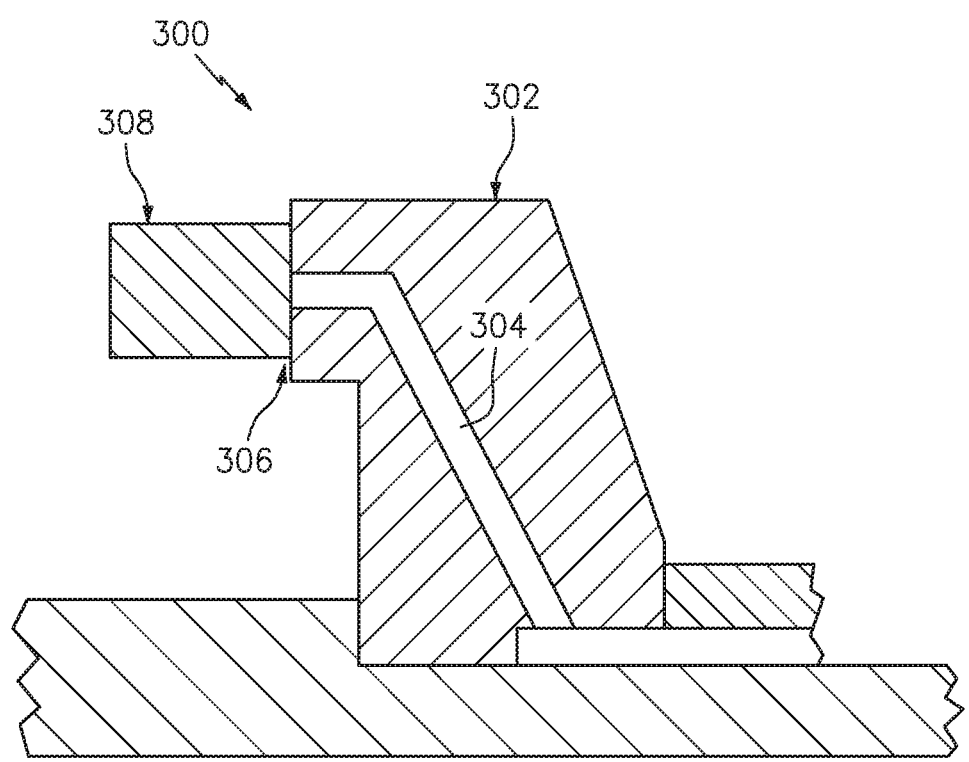
FIG. 3 is a partial side sectional illustration of a wet seal assembly arranged with a rotating structure.

The seal assembly 28 includes a (e.g., annular) seal element 52 and a (e.g., annular) seal land 54; e.g., a seal plate. The seal assembly 28 of FIG. 1 is configured as a dry seal assembly; e.g., a dry face seal assembly. The seal assembly 28 of FIG. 1, for example, is configured with a substantially dry seal interface between the seal element 52 and the seal land 54. The seal assembly 28 is thereby configured to have no liquid, or very little liquid (e.g., unintentional liquid seepage), at the seal interface between the seal element 52 and the seal land 54. By contrast, FIG. 3 illustrates a wet seal assembly 300 (e.g., a wet face seal assembly) in which a seal land 302 includes one or more liquid passages 304 for directing liquid such as lubricant and/or coolant to a wet seal interface 306 between a seal element 308 and the seal land 302.

Figure 4:
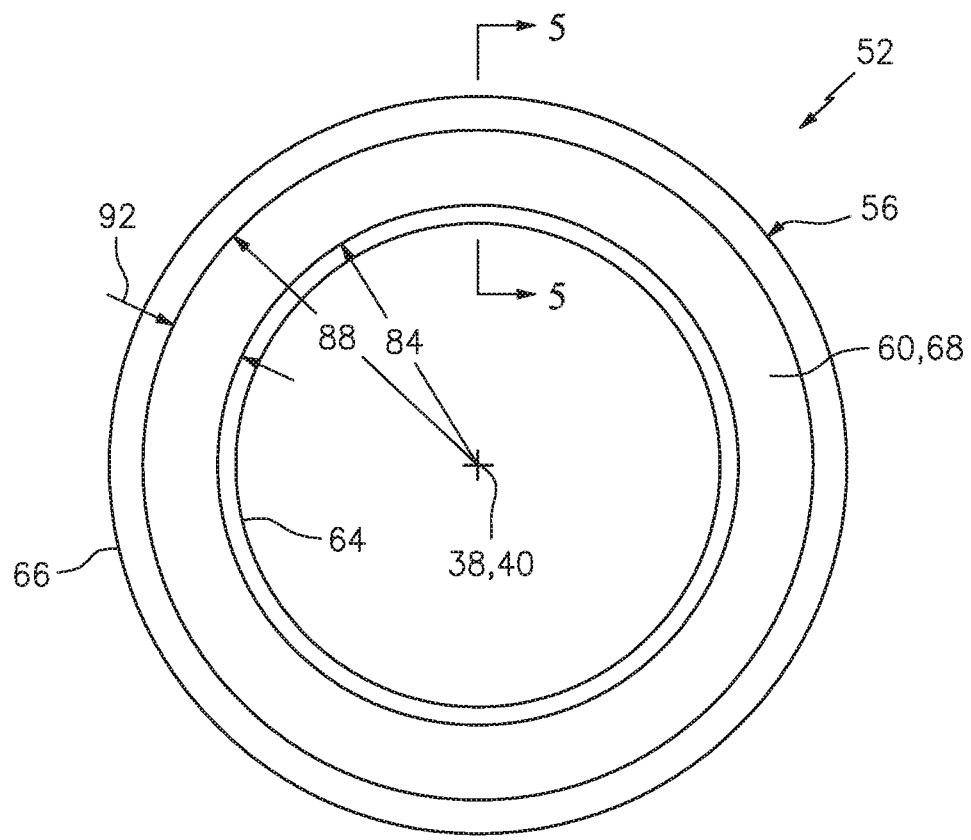
FIG. 4 is a first end view illustration of a seal element for a dry seal assembly.
Figure 5:
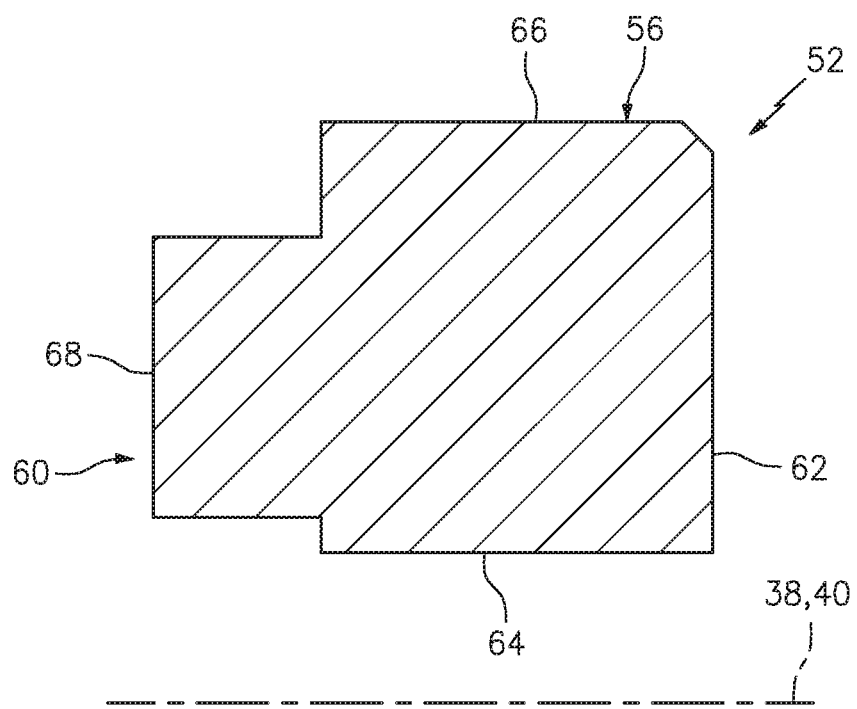
FIG. 5 is a partial side sectional illustration of the seal element taken along line 5-5 in FIG. 4.

Referring to FIGS. 4 and 5, the seal element 52 may be a carbon seal element 52. The seal element 52 extends circumferentially about (e.g., completely around) the axis 38. The seal element 52 of FIG. 4, for example, is configured with a full hoop seal element body 56 that extends completely circumferentially around the axis 38. This seal element body 56 may be a single unitary body; e.g., a monolithic body. Alternatively, referring to FIG. 6, the seal element body 56 may be a segmented body. For example, the seal element 52 may be configured from an array of arcuate seal element segments 58, which segments 58 are arranged end-to-end circumferentially about the axis 38. Referring again to FIGS. 4 and 5, the seal element body 56 extends axially along the axis 38 between an axial first seal element side 60 and an axial second seal element side 62. The seal element body 56 extends radially between a radial inner seal element side 64 and a radial outer seal element side 66.

Figure 6:
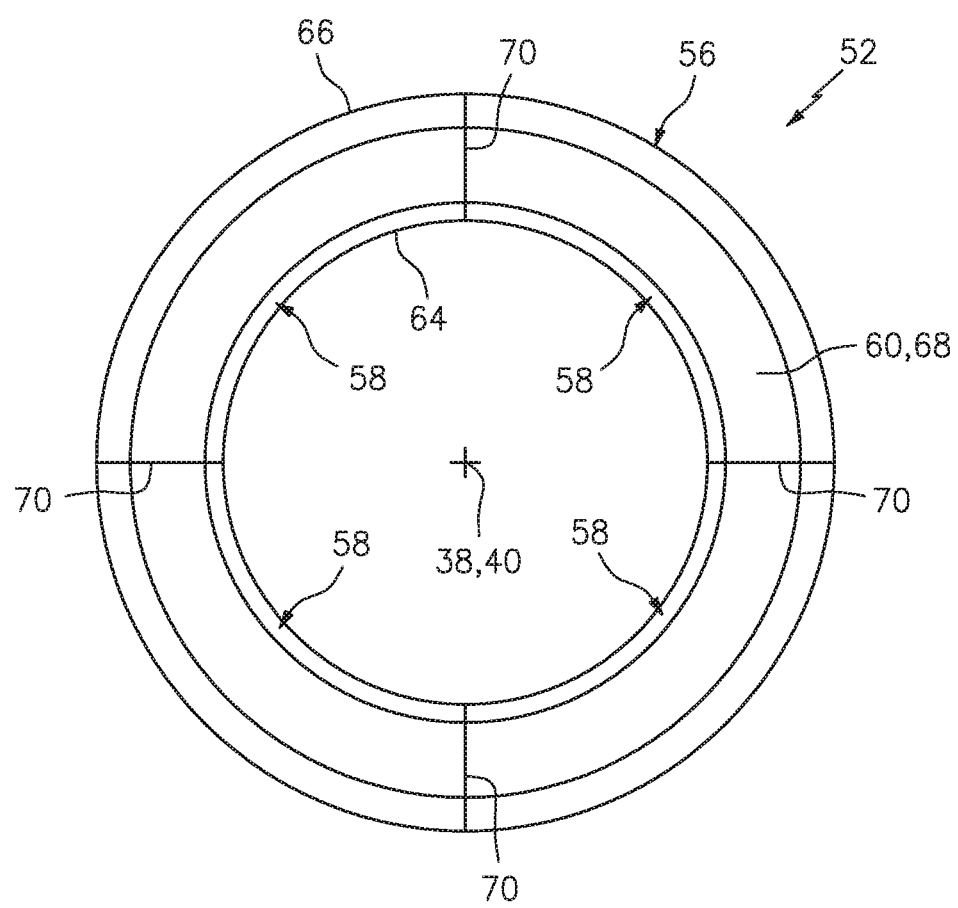
FIG. 6 is a first end view illustration of another seal element for the dry seal assembly.

The seal element 52 of FIGS. 4 and 5 includes a (e.g., annular) radially extending seal element surface 68. This seal element surface 68 is located at (e.g., on, adjacent or proximate) the first seal element side 60. The seal element surface 68 may be an uninterrupted surface. The seal element surface 68, for example, may be a flat planar surface configured without circumferential and/or radial interruptions such as, but not limited to, channels, slots and orifices. Of course, such an uninterrupted surface may (or may not) include inter-segment lines 70 (e.g., split lines) between adjacent segments 58 where the seal element 52 includes circumferential segments 58 as shown in FIG. 6. The present disclosure, however, is not limited to including such uninterrupted seal element surfaces. For example, in other embodiments, the seal element surface 68 may be circumferentially and/or radially interrupted by one or more channels, slots, orifices and/or other types of surface interruptions.

Figure 7:
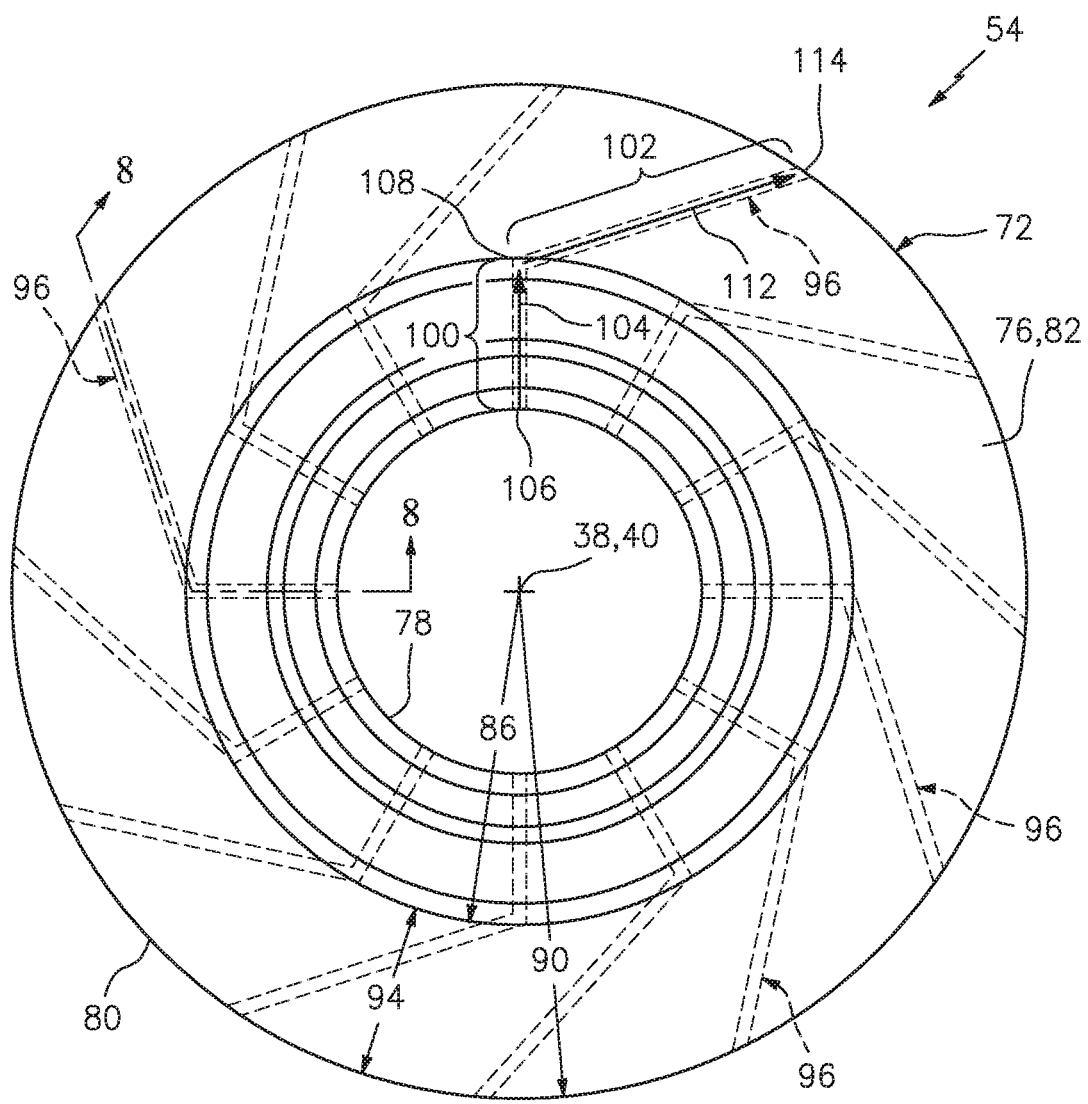
FIG. 7 is a second end view illustration of a seal land for the dry seal assembly with internal fluid passages shown by dashed lines.
Figure 8:
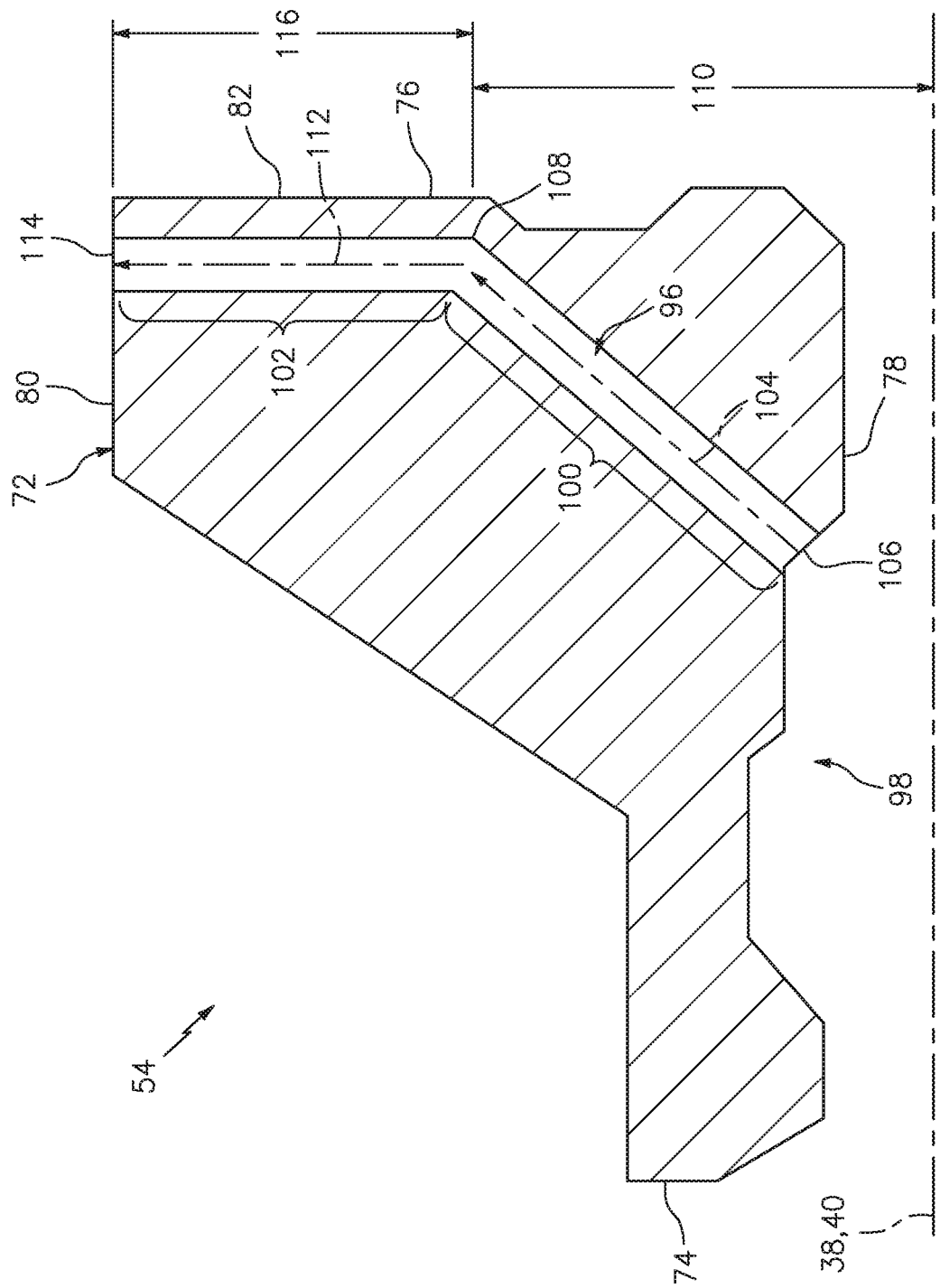
FIG. 8 is a partial side sectional illustration of the seal land taken along line 8-8 in FIG. 7.

Referring to FIGS. 7 and 8, the seal land 54 extends circumferentially about (e.g., completely around) the axis 38. The seal land 54 of FIG. 7, for example, is configured with a full hoop seal land body 72 that extends completely circumferentially around the axis 38. The exemplary seal land body 72 of FIG. 7 is a single unitary body; e.g., a monolithic body. The seal land body 72 extends axially along the axis 38 between an axial first seal land side 74 and an axial second seal land side 76. The seal land body 72 extends radially between a radial inner seal land side 78 and a radial outer seal land side 80.

The seal land 54 of FIGS. 7 and 8 includes a (e.g., annular) radially extending seal land surface 82. This seal land surface 82 is located at (e.g., on, adjacent or proximate) the second seal land side 76. At least a portion (e.g., an annular portion) or an entirety of the seal land surface 82 may be an uninterrupted surface. The seal land surface 82 of FIG. 7, for example, may be a flat planar surface configured without circumferential and/or radial interruptions such as, but not limited to, channels, slots and orifices. The present disclosure, of course, is not limited to such an exemplary uninterrupted seal land surface 82.

A geometry and location of the seal land surface 82 is selected to correspond to the geometry and location of the seal element surface 68; e.g., see FIGS. 4, 5, 7, 8 and 9. For example, referring to FIGS. 4 and 7, both the seal element surface 68 and the seal land surface 82 have corresponding (e.g., the same) circular annular shapes. A radius 84 of an inner end of the seal element surface 68 (see FIG. 4) may be greater than a radius 86 of an inner end of the seal land surface 82 (see FIG. 7). Similarly, a radius 88 of an outer end of the seal element surface 68 (see FIG. 4) may be less than a radius 90 of an outer end of the seal land surface 82 (see FIG. 7). Thus, a width 92 (e.g., radial height) of the seal element surface 68 (see FIG. 4) may be less than a width 94 (e.g., a radial height) of the seal land surface 82 (see FIG. 7), where the width 92 extends radially between the inner and the outer ends of the seal element surface 68 and the width 94 extends radially between the inner and the outer ends of the seal land surface 82. As a result, the seal element 52 and its surface 68 may maintain full sealing engagement (e.g., contact) with the seal land 54 and its surface 82 as described below (see also FIG. 9) even where there are radial shifts between the seal assembly components 52 and 54.

Referring to FIGS. 7 and 8, the seal land 54 is configured with one or more fluid passages 96 and a groove 98. These fluid passages 96 may be arranged circumferentially about the axis 38 in an annular array as best seen in FIG. 7. At least one, some or each of the fluid passages 96 includes an inner passage segment 100 and an outer passage segment 102 that is fluidly coupled with and downstream of the inner passage segment 100 of the same fluid passage 96.

The inner passage segment 100 extends along a first trajectory 104 within the seal land 54 and its body 72. The inner passage segment 100 of FIGS. 7 and 8, for example, extends along the first trajectory 104 from a respective fluid passage inlet 106 at the inner seal land side 78 towards the outer passage segment 102 of the same fluid passage 96. In the specific embodiment of FIGS. 7 and 8, the inner passage segment 100 extends to the outer passage segment 102 and thereby meets the outer passage segment 102 at a joint/an interface 108. A radius 110 of this joint 108 may be less than the radius 84 of the inner end of the seal element surface 68; e.g., see FIG. 4 as well as FIG. 9.

The first trajectory 104 (e.g., only or at least) includes an axial component and a radial component. The inner passage segment 100 may thereby extend axially and radially relative to the axis 38 (e.g., diagonally in a plane parallel to and coincident with the axis 38) within the seal element 52 from the fluid passage inlet 106 to the outer passage segment 102.

Of course, in other embodiments, the first trajectory 104 may also include a circumferential component. In the embodiments of FIGS. 7 and 8, the first trajectory 104 is a straight-line trajectory. Of course, in other embodiments, the first trajectory 104 may alternatively be a non-straight-line trajectory; e.g., a curved trajectory.

The outer passage segment 102 extends along a second trajectory 112 within the seal land 54 and its body 72, which second trajectory 112 is different than the first trajectory 104 of the inner passage segment 100 of the same fluid passage 96. The outer passage segment 102 of FIGS. 7 and 8, for example, extends along the second trajectory 112 away from the inner passage segment 100 of the same fluid passage 96 towards a respective fluid passage outlet 114 in a radial outer surface of the seal land 54 at the outer seal land side 80. In the specific embodiment of FIGS. 7 and 8, the outer passage segment 102 extends from the inner passage segment 100 and to the fluid passage outlet 114. Thus, a radial height 116 of the outer passage segment 102 may be greater than the width 92 (e.g., radial height) of the seal element surface 68 (see FIG. 4 as well as FIG. 9). The outer passage segment 102 may thereby (e.g., completely) radially overlap an engagement area 118 (e.g., seal interface) between the seal land 54 and the seal element 52; e.g., see FIG. 9. In addition, the radial height 116 of the outer passage segment 102 may also be at least seventy or eighty or ninety percent or more (e.g., up to 100, 110, 120% or more) of the width 94 (e.g., a radial height) of the seal land surface 82 (see FIG. 7). Thus, by disposing the outer passage segment 102 axially adjacent the seal land surface 82, the outer passage segment 102 may flow fluid (e.g., lubricant and/or liquid coolant) within the seal land 54 relatively close to the seal land surface 82 for cooling the engagement area 118 (see FIG. 9) as described below in further detail.

The second trajectory 112 (e.g., only) includes a radial component and a circumferential component. The outer passage segment 102 may thereby extend radially and circumferentially relative to the axis 38 (e.g., diagonally in a plane perpendicular to the axis 38) within the seal element 52 from the inner passage segment 100 to the fluid passage outlet 114. Of course, in other embodiments, the second trajectory 112 may also include an axial component. In the embodiments of FIGS. 7 and 8, the second trajectory 112 is a straight-line trajectory (see FIG. 7). Of course, in other embodiments, the second trajectory 112 may alternatively be a non-straight-line trajectory (e.g., a curved trajectory) as shown in FIG. 10, for example. By following the second trajectory 112 of FIG. 7 or 10, a length of the outer passage segment 102 adjacent the seal land surface 82/the engagement area 118 (see FIG. 9) is increased relative to, for example, an outer passage segment configured without a circumferential trajectory component.

The second trajectory 112 may be parallel with the seal land surface 82. The second trajectory 112 may also or alternatively be non-parallel to the axis 38; e.g., may lie in a plane perpendicular to the axis 38.

Referring to FIG. 8, the groove 98 is arranged in the seal land 54 at the inner seal land side 78. This groove 98 may be an annular groove (or one of a plurality of arcuate grooves) that extends circumferentially around the axis 38. The groove 98 may thereby be fluidly coupled with the fluid passage inlet 106 of each fluid passage 96. The groove 98 is configured with the seal land 54 to provide a well/a plenum for fluid (e.g., lubricant and/or liquid coolant) to collect/pool during turbine engine 22 operation. This collected/pooled fluid may then flow/be distributed into the fluid passages 96 through the fluid passage inlets 106.

Figure 9:
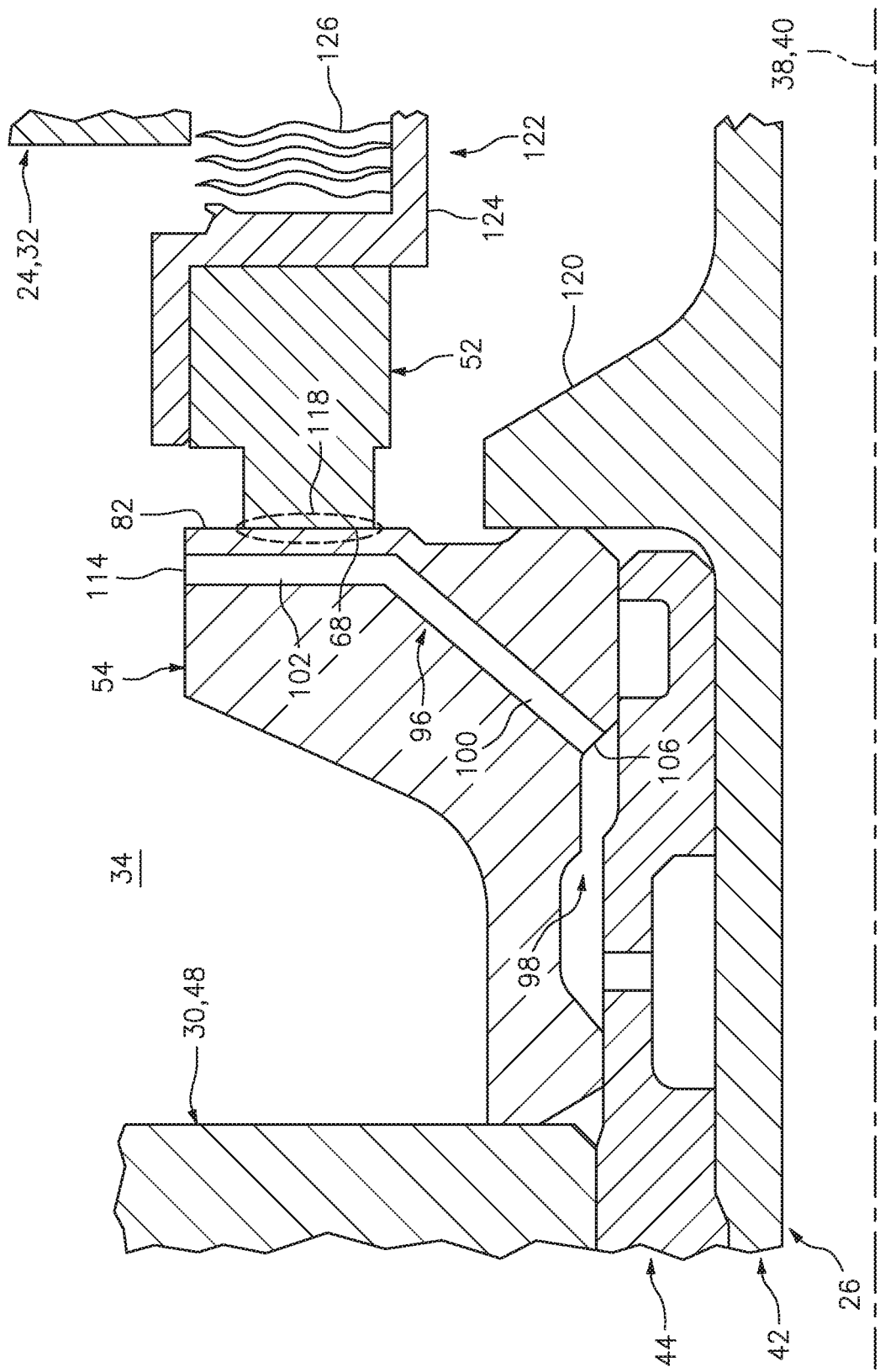
FIG. 9 is a partial side sectional illustration of the dry seal assembly sealing a gap between a stationary component and a rotating component.
Figure 10:
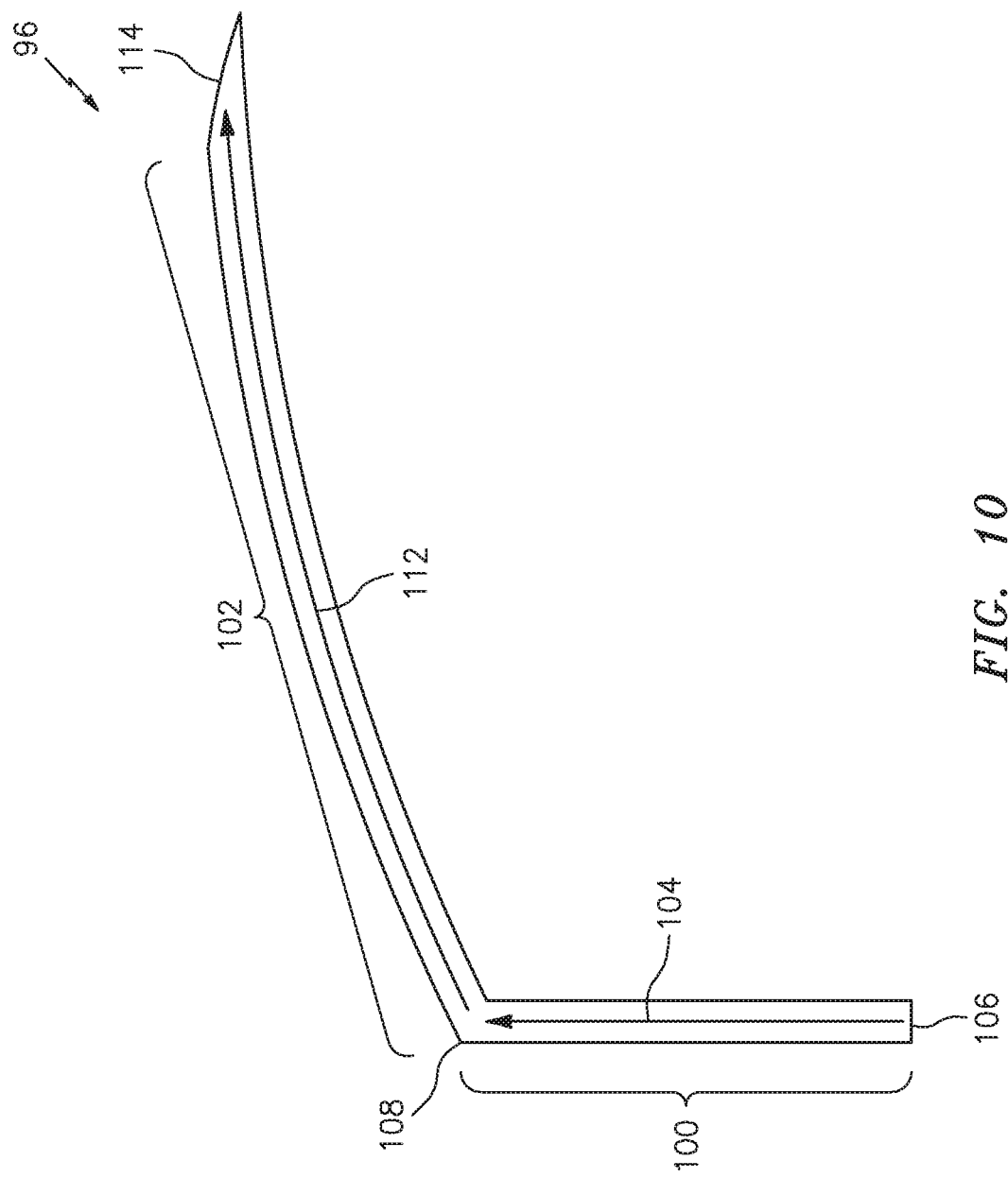
FIG. 10 is a side illustration of an alternative fluid passage configurations for the seal land.

Referring to FIG. 9, the seal land 54 is configured to rotate with the rotating component 26. For example, the seal land 54 is mounted to the rotating component 26 (e.g., the sleeve 44) and stacked (e.g., sandwiched) axially between the inner race 48 of the bearing 30 and another rotating element; e.g., a shoulder 120 of the shaft 42. The body of the seal land 54 extends circumferentially around the rotating component 26.

The seal element 52 is mated with a seal element support assembly 122. For example, the seal element 52 of FIG. 9 circumscribes the rotating component 26 and is mounted to a seal element carriage 124 such that the seal element surface 68 is aligned with the seal land surface 82. This seal element carriage 124 is configured to translate axially along the axis 38 and is biased in an axial direction towards the seal land 54 by one or more biasing elements 126; e.g., spring(s) such as coil spring(s) or wave spring(s). The seal element support assembly 122 is thereby configured to maintain the seal interface between the seal element 52 and the seal land 54 and, more particularly, a sealing engagement (e.g., contact) between, for example, an entirety of the seal element surface 68 and the seal land surface 82.

During turbine engine 22 operation, rubbing friction between the seal land surface 82 and the seal element surface 68 may subject the seal land 54 to relatively high temperatures at and near the engagement area 118. To reduce these high temperatures, the fluid is directed from the pool of fluid collected within the groove 98 into the fluid passage 96. This fluid flows within the fluid passages 96 and thereby is operable to receive thermal energy from the seal land 54 via conduction. The seal land 54 and notably a portion thereof proximate the engagement area 118 is thereby fluid cooled via the fluid within the outer passage segments 102 to reduce the operating temperature of the seal land 54.

Figure 11:
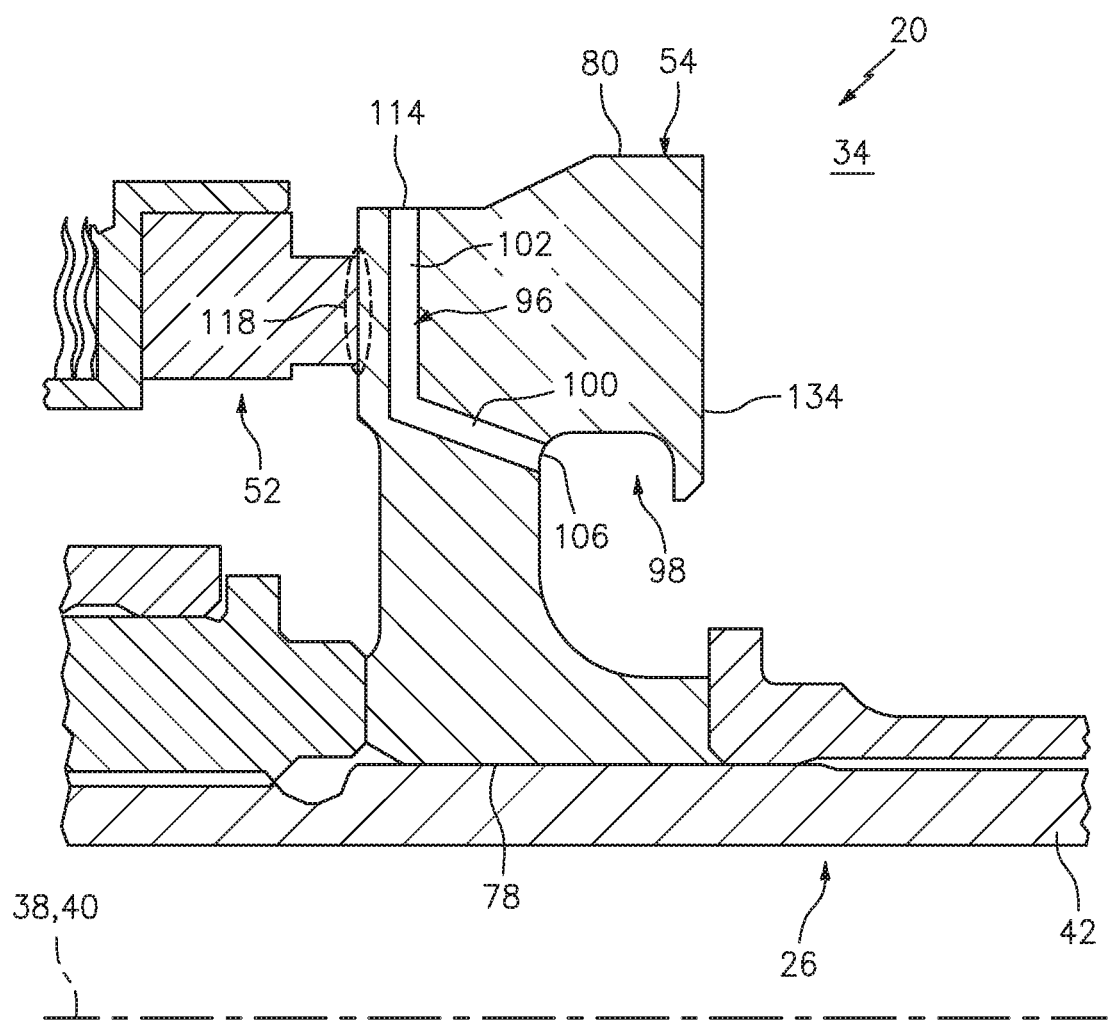
FIG. 11 is a partial side sectional illustration of the dry seal assembly with an alternative seal land.

The seal land body 72 may have various configurations other than those described above. For example, referring to FIG. 11, the groove 98 may be located in a cantilevered projection/overhang 134 and positioned radially between the inner seal land side 78 and the outer seal land side 80. The present disclosure therefore is not limited to any particular seal land body configuration.

FIG. 2 is a side cutaway illustration of the gas turbine engine 22, which is configured as a geared turbofan engine. This turbine engine 22 extends along the axial centerline 40 (e.g., the axis 38) between an upstream airflow inlet 136 and a downstream airflow exhaust 138. The turbine engine 22 includes a fan section 140, a compressor section 141, a combustor section 142 and a turbine section 143. The compressor section 141 includes a low pressure compressor (LPC) section 141A and a high pressure compressor (HPC) section 141B. The turbine section 143 includes a high pressure turbine (HPT) section 143A and a low pressure turbine (LPT) section 143B.

The engine sections 140-143B are arranged sequentially along the centerline 40 within an engine housing 144. This housing 144 includes an inner case 146 (e.g., a core case) and an outer case 148 (e.g., a fan case). The inner case 146 may house one or more of the engine sections 141A-143B; e.g., an engine core. The outer case 148 may house at least the fan section 140.

Each of the engine sections 140, 141A, 141B, 143A and 143B includes a respective rotor 150-154. Each of these rotors 150-154 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 150 is connected to a gear train 156, for example, through a fan shaft 158. The gear train 156 and the LPC rotor 151 are connected to and driven by the LPT rotor 154 through a low speed shaft 159. The HPC rotor 152 is connected to and driven by the HPT rotor 153 through a high speed shaft 160. The shafts 158-160 are rotatably supported by a plurality of bearings 162; e.g., rolling element and/or thrust bearings. Each of these bearings 162 is connected to the engine housing 144 by at least one stationary structure such as, for example, an annular support strut. The shaft 42 of FIG. 1 may be configured as any one of the shafts and the bearing 30 of FIG. 1 may be configured as any one of the bearings 162.

During operation, air enters the turbine engine 22 through the airflow inlet 136. This air is directed through the fan section 140 and into a core gas path 164 and a bypass gas path 166. The core gas path 164 extends sequentially through the engine sections 141A-143B. The air within the core gas path 164 may be referred to as "core air". The bypass gas path 166 extends through a bypass duct, which bypasses the engine core. The air within the bypass gas path 166 may be referred to as "bypass air".

The core air is compressed by the compressor rotors 151 and 152 and directed into a combustion chamber 168 of a combustor in the combustor section 142. Fuel is injected into the combustion chamber 168 and mixed with the compressed core air to provide a fuel-air mixture. This fuel air mixture is ignited and combustion products thereof flow through and sequentially cause the turbine rotors 153 and 154 to rotate. The rotation of the turbine rotors 153 and 154 respectively drive rotation of the compressor rotors 152 and 151 and, thus, compression of the air received from a core airflow inlet. The rotation of the turbine rotor 154 also drives rotation of the fan rotor 150, which propels bypass air through and out of the bypass gas path 166. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 2), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

Figure 12:
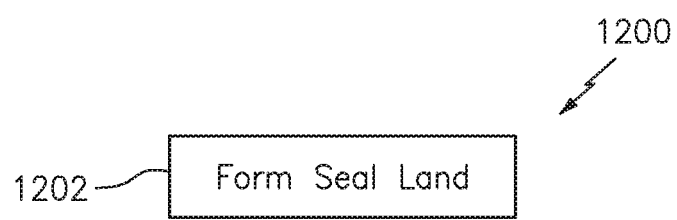
FIG. 12 is a flow diagram of a method for manufacturing a seal land.

FIG. 12 is a flow diagram of a method 1200 for manufacturing a seal land such as, but not limited to, the seal land 54 described above. In step 1202, the seal land 54 is formed. For example, the seal land 54 and one or more or all of its various features (e.g., at least the fluid passage(s)) may be formed via additive manufacturing. Alternatively, a body for the seal land 54 without the passages 96 or with partially formed passages may be formed, for example, via casting and/or machining. Then, one or more of the fluid passages 96 or portions thereof may be drilled into the body, for example, via electrical discharge machining (EDM) drilling.

Of course, various other formation methods may be used to provide a seal land such as the seal land 54 described above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A seal land for a seal assembly in a piece of rotational equipment, the seal land comprising:
    a seal land body extending circumferentially about an axis and radially between an inner seal land side and an outer seal land side;
    the seal land body configured with a groove and a plurality of fluid passages arranged about the axis;
    a first of the plurality of fluid passages including an inner passage segment and an outer passage segment fluidly coupled with the inner passage segment;
    the inner passage segment extending along a first trajectory within the seal land body towards the outer passage segment;
    the outer passage segment extending along a second trajectory within the seal land body away from the inner passage segment and towards the outer seal land side, wherein the second trajectory is different than the first trajectory and includes a radial component and a circumferential component; and
    the groove fluidly coupled with the first fluid passage, and the groove extending radially into the seal land body from the inner seal land side;
    wherein the seal land body includes an annular seal land surface configured to axially and sealingly engage with a seal element of the seal assembly;
    wherein the outer passage segment is disposed axially adjacent the annular seal land surface;
    wherein the second trajectory is parallel with the annular seal land surface;
    wherein the annular seal land surface has a first radial height; and
    wherein the outer passage segment has a second radial height that is at least eighty percent of the first radial height.

2. The seal land of claim 1, wherein the second trajectory is perpendicular to the axis.

3. The seal land of claim 1, wherein the second trajectory is a straight-line trajectory.

4. The seal land of claim 1, wherein
    the seal land body includes a first groove side surface and a second groove side surface; and
    the groove extends axially along the axis within seal land body between the first groove side surface and the second groove side surface.

5. A seal land for a seal assembly in a piece of rotational equipment, the seal land comprising:
    a seal land body extending circumferentially about an axis and radially between an inner seal land side and an outer seal land side;
    the seal land body configured with a groove and a plurality of fluid passages arranged about the axis;
    a first of the plurality of fluid passages including an inner passage segment and an outer passage segment fluidly coupled with the inner passage segment the inner passage segment extending along a first trajectory within the seal land body towards the outer passage segment;
    the outer passage segment extending along a second trajectory within the seal land body away from the inner passage segment and towards the outer seal land side, wherein the second trajectory is different than the first trajectory and includes a radial component and a circumferential component; and
    the groove fluidly coupled with the first fluid passage, and the groove extending radially into the seal land body from the inner seal land side;
    wherein the second trajectory is a non-straight-line trajectory.

6. An assembly for a piece of rotational equipment, the assembly comprising:
    a rotating component configured to rotate about an axis, the rotating component comprising a rotating component outer surface;
    an annular seal land mounted to and configured to rotate with the rotating component; and
    an annular seal element configured to sealingly engage a seal land surface of the annular seal land in an axial direction along the axis;
    the annular seal land configured with a groove and a plurality of fluid passages arranged about the axis;
    a first of the plurality of fluid passages including an inner passage segment and an outer passage segment fluidly coupled with the inner passage segment;
    the inner passage segment extending along a first trajectory within the annular seal land towards the outer passage segment;
    the outer passage segment extending along a second trajectory within the annular seal land to a radial outer surface of the annular seal land, wherein the second trajectory is different than the first trajectory and includes a radial component and a circumferential component; and
    the groove fluidly coupled with the first fluid passage, the groove extending radially into the annular seal land from the inner seal land side, and the groove radially adjacent the rotating component outer surface;
    wherein the second trajectory is a curved trajectory.

7. The assembly of claim 6, further comprising a dry seal assembly that includes the annular seal land and the annular seal element.

8. The assembly of claim 6, wherein the annular seal element comprises a carbon seal element.

9. The assembly of claim 6, wherein the inner passage segment extends along the first trajectory to the outer passage segment.

10. The assembly of claim 6, wherein the outer passage segment is disposed axially adjacent the seal land surface.

11. The assembly of claim 6, wherein the outer passage segment completely radially overlaps an engagement area between the annular seal element and the annular seal land.

12. The assembly of claim 6, further comprising:
    a stationary component of a turbine engine;
    wherein the annular seal element is mounted to the stationary component of the turbine engine.

* * * * *